(12) United States Patent
Twerdochlib

(10) Patent No.: US 6,661,222 B1
(45) Date of Patent: Dec. 9, 2003

(54) TURBINE BLADE CLEARANCE ON-LINE MEASUREMENT SYSTEM

(75) Inventor: Michael Twerdochlib, Oviedo, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 4 days.

(21) Appl. No.: 10/158,954

(22) Filed: May 31, 2002

(51) Int. Cl.[7] ................................................ G01B 7/14
(52) U.S. Cl. .............................. 324/207.26; 324/207.16
(58) Field of Search ..................... 324/207.16, 207.24, 324/207.26, 219–222, 329, 173, 202; 702/104, 97; 73/1.37, 1.41, 660, 633; 33/542

(56) References Cited

U.S. PATENT DOCUMENTS

| | | | |
|---|---|---|---|
| 4,139,822 A | | 2/1979 | Urich et al. |
| 4,412,177 A | | 10/1983 | Petrini et al. |
| 4,518,917 A | * | 5/1985 | Oates et al. ............ 324/207.25 |
| 4,659,988 A | | 4/1987 | Goff et al. |
| 4,967,153 A | * | 10/1990 | Langley ....................... 324/174 |
| 4,970,670 A | | 11/1990 | Twerdochlib |
| 4,987,555 A | | 1/1991 | Twerdochlib |
| 5,465,045 A | | 11/1995 | DeRock |
| 5,572,119 A | | 11/1996 | Taylor |
| 5,691,636 A | * | 11/1997 | Allshouse et al. ...... 324/207.15 |

* cited by examiner

Primary Examiner—N. Le
Assistant Examiner—Reena Aurora

(57) ABSTRACT

A monitoring system for measuring the gap between a turbine blade and a stationery component of a turbine, includes an insertion probe having a sensor which is moved radially within the gap to a pre-selected distance from the turbine blade as measured by the sensor's output. The distance the sensor moved from a reference point to arrive at the pre-selected distance from the blade is also monitored and the gap between the fixed turbine component and the blade is determined from these measurements.

21 Claims, 2 Drawing Sheets

TURBINE BLADE CLEARANCE ON-LINE MEASUREMENT SYSTEM

BACKGROUND OF THE INVENTION

1. Field of the Invention

The present invention is directed generally to systems for monitoring the clearance between fixed and rotating parts within a combustion turbine and, more particularly, to systems of that type that operate on line.

2. Related Art

The clearance between the stationery seals of a turbine and compressor and the tips of the blades must not be so great to permit an excessive amount of air in the case of the compressors and combustion gases in case of the turbines to pass between them and thereby reduce the efficiency of the turbine. On the other hand, clearances can not be too small because high centripetal loading and high temperatures may cause blades to lift or grow radially. Such blade lifting or radial growth can cause blade tips to rub the stationery seal and may eventually cause seal, and blade tip damage.

In addition, the differences in thermal response time of the various combustion turbine components can result in the mechanical interference between stationery and moving parts under certain conditions. This is certainly the case during the restart of a hot turbine where contact between the compressor/turbine blading and the blade ring has resulted in massive compressor and turbine damage. Even a slight rub will destroy blade seals and reduce the efficiency of a combustion turbine. The obvious solution is to prolong restart until the turbine cools. This requires many hours. However, the situation is further complicated by the competing need to spin-cool the turbine following shutdown to prevent sagging or humping of the rotor. Both can only be done if the blade clearance is accurately measured, and appropriate action is taken based on this on-line measurement.

Capacitance blade clearance probes are used to study blade clearance patterns to establish restart and spin-cool rules. These sensors have proven both inaccurate and unreliable as an engineering tool and are thus even less suitable for commercial on-line monitoring.

A number of blade clearance systems have been developed for steam turbines, such as those described in U.S. Pat. No. 4,987,555. These systems depend upon indicia on the blades shroud to obtain a meaningful proximity measurement. However, the approaches do not appear readily applicable to combustion turbine applications.

Accordingly, a need exists for an on-line combustion turbine blade clearance monitor that can accurately measure, in real time, the clearance between the blades and blade ring of a combustion turbine.

SUMMARY OF THE INVENTION

An on-line, real time blade clearance monitor is provided to meet the foregoing objectives. The clearance monitor includes an insertion probe that is positioned within a stationary member portion of the turbine and reciprocally moveable within a cavity, preferably radially in line with the turbine blade at the point where the blade is closest to the stationary member. A proximity sensor is supported at one end of the insertion probe closest to the turbine blade and a connecting rod is affixed to the other end of the insertion probe. The connecting rod is reciprocally driven by a motor such as a stepper motor or a pulsed D.C. motor and resolver that provides a positional output to a computer. A calibration indicia is provided that results in a unique output of the proximity sensor when the proximity sensor is positioned flush with an interior surface of the stationery turbine member that faces the turbine blade.

In operation, the insertion probe starts from a point where the proximity sensor is flush with the interior surface of the stationary turbine member. The insertion probe is then advanced towards the blade until the proximity sensor output is a preselected distance from the turbine blade as represented by a given output of the sensor and recognized by a computer controller. The computer controller also monitors the motor drive to determine the distance the insertion probe has been moved towards the compressor blade. The computer controller then calculates the clearance distance between the blade and the stationary turbine member by adding the preselected distance to the monitored advancement of the insertion probe as indicated by the motor drive to the computer controller.

Preferably, the insertion probe is constructed of materials that will not substantially damage the blade should the insertion probe and the blade come in contact. Desirably, the electrical continuity of the proximity sensor is monitored to determine whether any such contact has occurred. If the sensor is disabled, the computer controller directs the motor to withdraw the insertion probe to the calibration point.

During turbine operation or cool-down while rotation of the rotor is maintained, the foregoing clearance measurement is monitored at periodic intervals such as every five minutes, though the steps of the method of this invention may be repeated as often as every five seconds.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
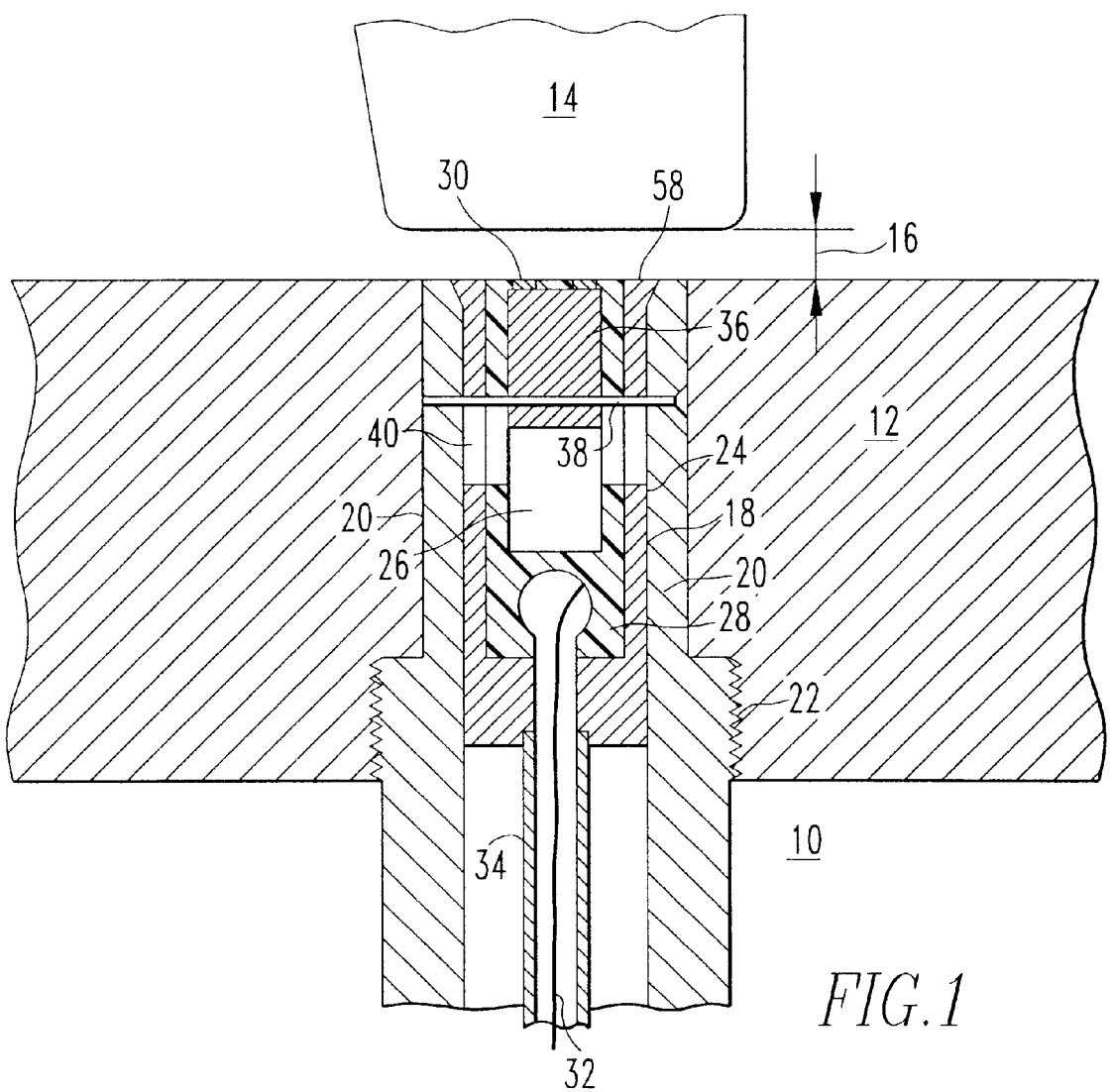
FIG. 1 is a plan view of a blade ring and compressor blade with the support structure, connecting rod and insertion probe assembly shown cut away and with the insertion probe shown in cross-section.

FIG. 1 illustrates the forward sensing portion of the blade clearance monitoring system 10 of this invention for monitoring the clearance 16 between a turbine blade, such as a compressor blade 14 and a stationary component of the turbine such as a blade ring 12. A very small eddy current search coil 30 is employed to provide a short range and sensitive indication by means of a discrete voltage signal level output, of the proximity of the blade tip and search coil in the order of 0.010 inch (0.254 mm). A search coil 30 that can be employed for this purpose preferably has an inner diameter from between 0.020 to 0.050 inch (0.508–1.27 mm). The search coil is mounted at an end of a short throw insertion probe 18. A short throw of approximately 0.25 inch (6.35 mm) can be employed for this purpose. In other words, the insertion probe 18 has an approximate range of movement in the radial direction towards the blade 14 of approximately 0.25 inch (6.35 mm). The insertion probe is slideably supported coaxially within an outer support 20 fixed within the compressor ring 12 by mating threads 22. The insertion probe has a thin outer stainless steel wall 24 having a thickness of, for example, 0.20–0.375 inch (5.08–9.525 mm). The interior of the insertion probe 18, surrounding an elongated hollow cavity 26, is filled with an epoxy or ceramic 28. The end of the insertion probe wall 24 juxtaposed to the compressor blade 14 is slightly enlarged to seat against a mating surface of the outer support 20 when the search coil 30 is seated flush with the surface of the blade ring opposing the compressor blade 14.

Figure 2:
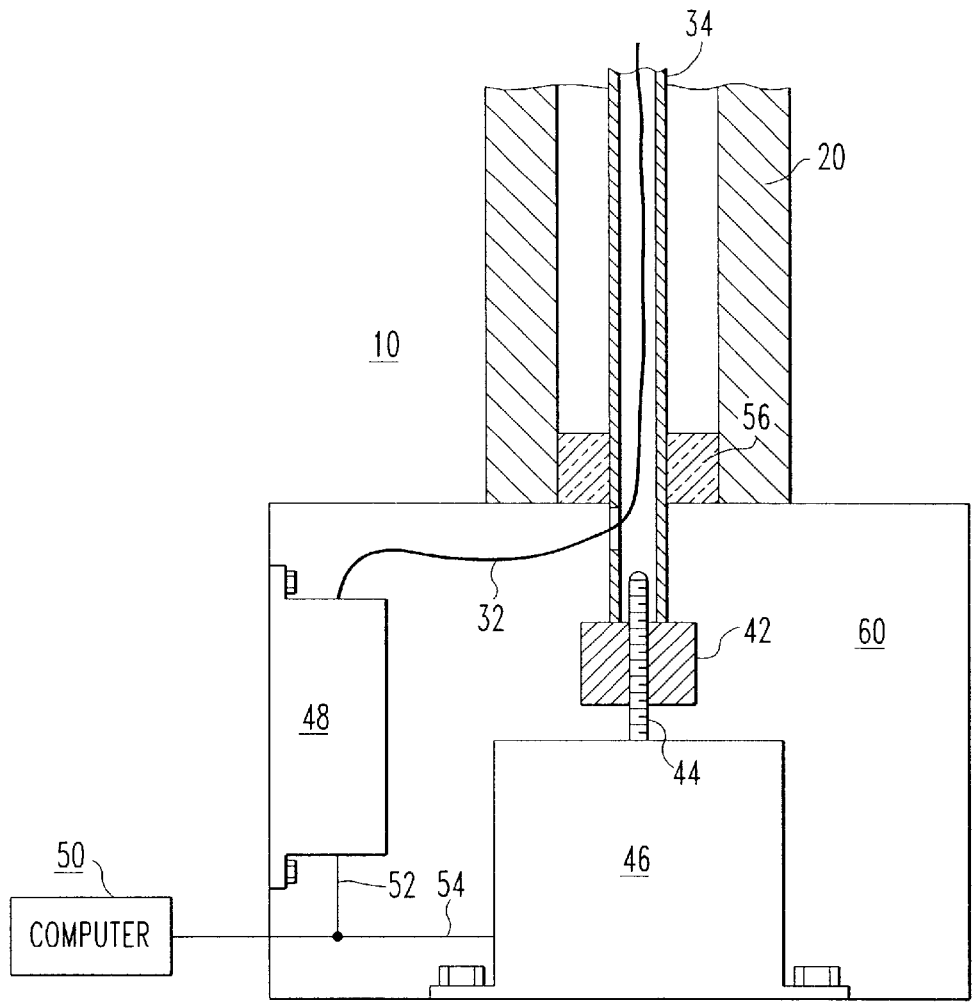
FIG. 2 is a plan view of the motor/controller portion of the monitoring system of this invention with portions cut away to reveal the interior operation thereof.

Radial translation of the insertion probe 18 towards and away from the compressor blade 14 within the support 20 is achieved by means of a connecting rod 34, screw action and computer controlled stepper motor drive assembly 60 mounted outside the turbine and shown in FIG. 2. Alternately, a pulsed D.C. motor and resolver can be employed. The D.C. motor provides more torque than the stepper motor and the resolver is connected to the motor's shaft and directly measures the shaft's rotation.

Confirmation that the search coil is properly seated in the reference position flush with the blade ring 12 surface is achieved by means of a hollow cylindrical electrically conductive slug 36 positioned within the hollow cavity 26 of the insertion probe 18, shown below the search coil 30 in FIG. 1. The reference slug 36 is affixed to the outer support member 20 by a pin 38 passing diametrically through axial slots 40 in the insertion probe 18 so that when the probe is driven radially, the pin 38 rides within the axial slots 40 maintaining the slug 36 in a fixed position relative to the support structure 20. The insertion probe 18 is thus free to translate within the fixed outer support 20 and over the fixed reference slug 36. The reference slug length and position within the outer support is set so the search coil provides a unique indication that the insertion probe's intruding surface into the gap between the blade 14 and the blade ring 12 is flush with the inner blade ring surface, hereafter at times referred to as the insertion probe "reference position" or "calibration point". The signal from the proximity sensor coil 30 is communicated through the coil leads 32 which are threaded through the connecting rod 34 to the drive assembly 60 shown in FIG. 2. The signal 32 is connected to a search coil controller circuit 48, which communicates the discrete outputs 52 to a computer 50. The end of the connecting rod 34 opposite the insertion probe 18 is fitted with a female-threaded coupling 42 which is translated by a rotating screw 44 having a mating male thread, which is, in turn, driven by a stepper motor 46. The stepper motor 46 is controlled by the computer 50, which directs the number of steps to be taken and the direction of rotation of the motor 46. The motor 46 also preferably provides a position signal 54 to the computer 50, confirming the steps that have been taken. The drive assembly 60 also includes a pressure seal 56 that isolates the drive assembly 60 from exposure to the high-pressure interior turbine environment.

Blade clearance is measured relative to the reference position by advancing the insertion probe to a preselected radial distance from the blade, the pre-selected distance, in this case is 0.010 in (0.254 mm). This is the distance where the search coil signal peak amplitude indicates the longest blade is within the pre-selected distance of the insertion probe. The distance of the blade from the stationary member is then calculated from the motor step angle and screw pitch using the equation:

Radial translation=(Number of motor steps)×(Motor Rev Per Step)×(Inch/mm per thread)     (1)

Figure 3:
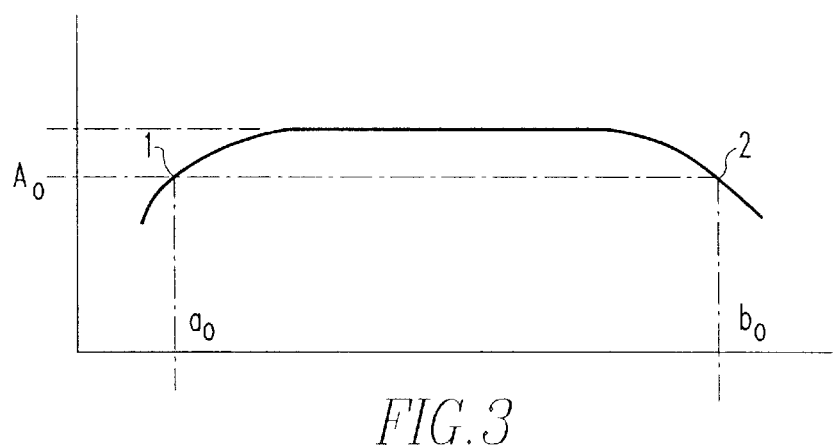
FIG. 3 is a graphical illustration of the proximity coil output signal of the invention plotted over the travel distance of the coil.

FIG. 3 graphically illustrates the search coil peak voltage output as a function of the travel distance of the coil. The Y axis denotes the peak voltage on the excited search coil and the X axis denotes the gap or distance from the search coil to the blade tip. As the search coil approaches the blade tip, the voltage on the excited search coil drops. This drop rate increases as the gap between the search coil and the blade tip becomes smaller. At a 0.005–0.020 inch (0.127–0.508 mm) gap, the slope, which shows the rate of the decrease of the peak voltage on the excited search coil as the gap between the search coil and the blade tip decreases, is high providing a sensitive determination of the search coil/blade tip gap. This coil voltage is $A_o$ (volts peak) when the gap is $a_o$. For example, this voltage is $6V_p$ at a 0.010 inch (0.254 mm) gap. When the coil voltage drops to $6V_p$, the coil/blade tip gap is thus determined to be 0.010 inch (0.254 mm).

Insertion probe movement is governed by control of the computer 50 using the algorithm:

[n is set so as to provide approximately 0.001 to 0.002" (0.025–0.05 mm) displacement]

(find reference position)

1 measure search coil signal peak amplitude "A" volts)
2 withdraw search coil "N" stepper motor steps
3 measure search coil signal peak amplitude "B" volts)
4 compare peak amplitude A and B
5 |A−B|<0.001 goto 1 (on flat portion of the curve between points (1) and (2) shown in FIG. 3—need to withdraw further)
6 A<B go to 1
7 B>$A_o$ go to 1
8 stop—reference found (find blade clearance)
9 m=0 (set motor step counter to zero)
10 step motor into turbine n steps
11 m=m+n
12 measure search coil signal peak amplitude "C" volts)
13 compare peak amplitude C and $A_o$
14 C>$A_o$ go to 11 (measure blade clearance)
15 R_T=m*M_R_per_S*I_per_T+$a_o$
16 compare R_T and Alert_Level
17 Alert_Level>R_T goto 1 (no rub will occur between blade ring and blade tip)
18 Energize Alert Relay (if not 17 rub will occur) (repeat process)
19 goto 1 (make next measurement)

The alert level is determined by the computer based on the turbine condition, i.e., at turning gear, 132 minutes after a full load trip or at 2 minutes into spin cool cycle following 31 minutes at turning gear following full load unit trip. Under these conditions, the assigned radial translation for the alert level implies a rub will occur between the blade's tip and the blade ring at or below the alert level measurement.

Electrical continuity of the search coil 30 is continually monitored by the computer 50. Should electrical continuity or the proximity signal be lost as a result of unplanned contact with the blade, the insertion probe is returned to the reference position and placed in a sleep mode. The insertion probe is constructed of epoxy or ceramic filled 0.375 inch (9.525 mm) thin-walled stainless steel tubing weighing a few ounces resulting in no possibility of blade or internal turbine damage should unplanned contact with the blade be made.

A blade gap measurement could be taken every five seconds, but a five minute cycle time is preferable given the thermal response time of the compressor. Probes are easily replaceable from outside the turbine. The system can also be applied to hot turbine blades if high temperature diamond or ceramic insulated wire and ceramic nonconductive materials are used. The stepper motor can easily operate in the temperature environment outside the compressor and turbine engine, which is less than 200° F. (93.3° C.). The support structure 20 can be constructed of any compatible metal that is capable of handling the caustic environment to which it is being exposed, such as stainless steel or a ceramic composite.

Thus, a monitoring system of this invention can provide a precise and durable gap measurement that is reliable. While specific embodiments of the invention have been described in detail, it will be appreciated by those skilled in the art that various modifications and alternatives to those details could be developed in light of the overall teachings of the disclosure. For example, other proximity sensors could be employed such as a capacitance sensor. Accordingly, the particular embodiments disclosed are meant to be illustrative only and not limiting as to the scope of the invention which is to be given the full breadth of the appended claims and any and all equivalents thereof.

What is claimed is:

1. A system for monitoring the clearance between a plurality of turbine blades and a stationary portion of the turbine, comprising:
    sensor means having an exterior tubular support structure with an axial dimension, that supports a centrally disposed drive shaft that is reciprocally mounted within the support structure to move along the axis thereof, said sensor means positioned within said stationary portion of the turbine and aligned so that the reciprocal movement of the drive shaft moves a forward end of the drive shaft, closest to the turbine blades, towards and away from the turbine blades;
    a proximity sensor that is responsive to being positioned substantially a preselected distance from the turbine blade to provide a given output representative of the preselected distance, supported at the forward end of and coupled to said drive shaft so that said proximity sensor moves with the drive shaft;
    a motor coupled to said drive shaft and operable to move said drive shaft a given distance either towards or away from the turbine blades and responsive to such movement to provide a position output from which the sensor position can be determined relative to its distance from a predetermined calibration point; and
    means for monitoring the sensor output and controlling the motor movement, so the sensor is substantially positioned the preselected distance from the blade determined by monitoring for the given output, and for monitoring the position output to determine the distance of the blade from the calibration point.

2. The monitoring system of claim 1 wherein the proximity sensor comprises an eddy current search coil.

3. The monitoring system of claim 2 wherein the search coil inside diameter is between approximately 0.020 and 0.050 inch (0.508 to 1.27 mm).

4. The monitoring system of claim 1 wherein the preselected distance is 0.010 inch (0.254 mm).

5. The monitoring system of claim 1 wherein the drive shaft is axially movable over a distance of approximately, at least 0.250 inch (6.35 mm).

6. The monitoring system of claim 1 wherein the predetermined calibration point is located at the location along an axis of movement of the proximity sensor that places a surface of the proximity sensor, opposite the blades, flush with an interior surface of the stationary portion of the turbine.

7. The monitoring system of claim 1 including an electrically conductive slug strategically positioned in fixed relation to the tubular support structure at a location that provides a unique output at the proximity sensor when the proximity sensor is at the calibration reference point.

8. The monitoring system of claim 7 including an insertion probe, positioned within the support structure, said insertion probe having a first end affixed to the forward end of the drive shaft between the drive shaft and the proximity sensor which is affixed to the axially opposite end to said first end.

9. The monitoring system of claim 8 wherein said insertion probe has an elongated, tubular, axially extending, hollow core and said electrically conductive slug is stationarally supported within said core relative to said support structure.

10. The monitoring system of claim 9 wherein said electrically conductive slug is supported within said core by a pin that extends transverse to the axis of the support structure, through said slug, through axially extending slots in said insertion probe and into said support structure.

11. The monitoring system of claim 9 wherein the electrically conductive slug is formed as a hollow cylinder.

12. The monitoring system of claim 1 wherein said insertion probe is constructed from thin walled stainless tubing having a wall thickness of approximately 0.20–0.375 inch (5.08–9.525 mm).

13. The monitoring system of claim 12 wherein the thin walled stainless steel tubing comprises an epoxy or ceramic filling.

14. The monitoring system of claim 1 including means for monitoring the continuity of the search coil.

15. The monitoring system of claim 1 wherein the stationary portion of the turbine is a blade ring.

16. A method of monitoring the clearance between a plurality of turbine blades and a stationary portion of the turbine comprising the steps of:
    positioning a proximity sensor at a calibration point relative to the stationary portion of the turbine;
    driving the proximity sensor away from the stationary portion of the turbine towards the blades while monitoring an output signal of the proximity sensor;
    identifying from the output of the proximity sensor when the proximity sensor is at a preselected distance from the blades;
    monitoring a distance of movement of the proximity sensor from the calibration point to a travel point along the path of movement of the proximity sensor where the proximity sensor is at the preselected distance from the blades; and
    determining from the distance of movement the spacing between the stationary portion of the turbine and the blades.

17. The method of claim 16 including the step of monitoring the electrical continuity of the proximity sensor.

18. The method of claim 17 including the step of returning the proximity sensor to the calibration point should the continuity monitoring step detect a loss of electrical continuity in the proximity sensor.

19. The method of claim 16 including the step of repeating the method of claim 14 at least substantially every 5 minutes.

20. The method of claim 19 wherein the method is repeated approximately every 5 seconds.

21. The method of claim 16 including the step of withdrawing the proximity sensor substantially to the calibration point when the monitoring step is complete.

* * * * *